April 5, 1960   J. A. DELALOYE ET AL   2,931,067
METHOD AND APPARATUS FOR PRODUCING GRANULATED AMMONIUM NITRATE
Filed Oct. 14, 1955   3 Sheets-Sheet 2
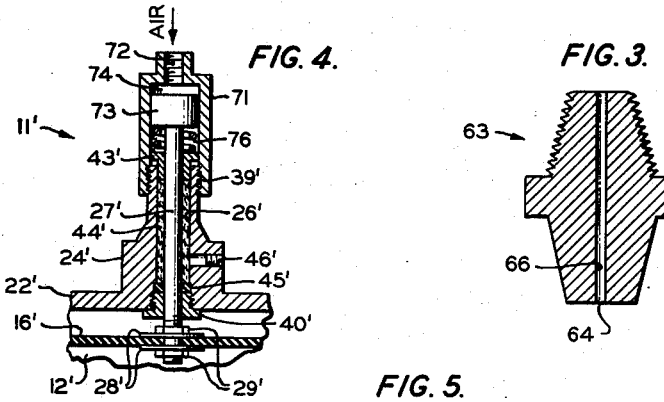
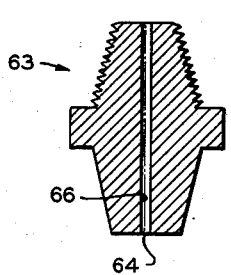
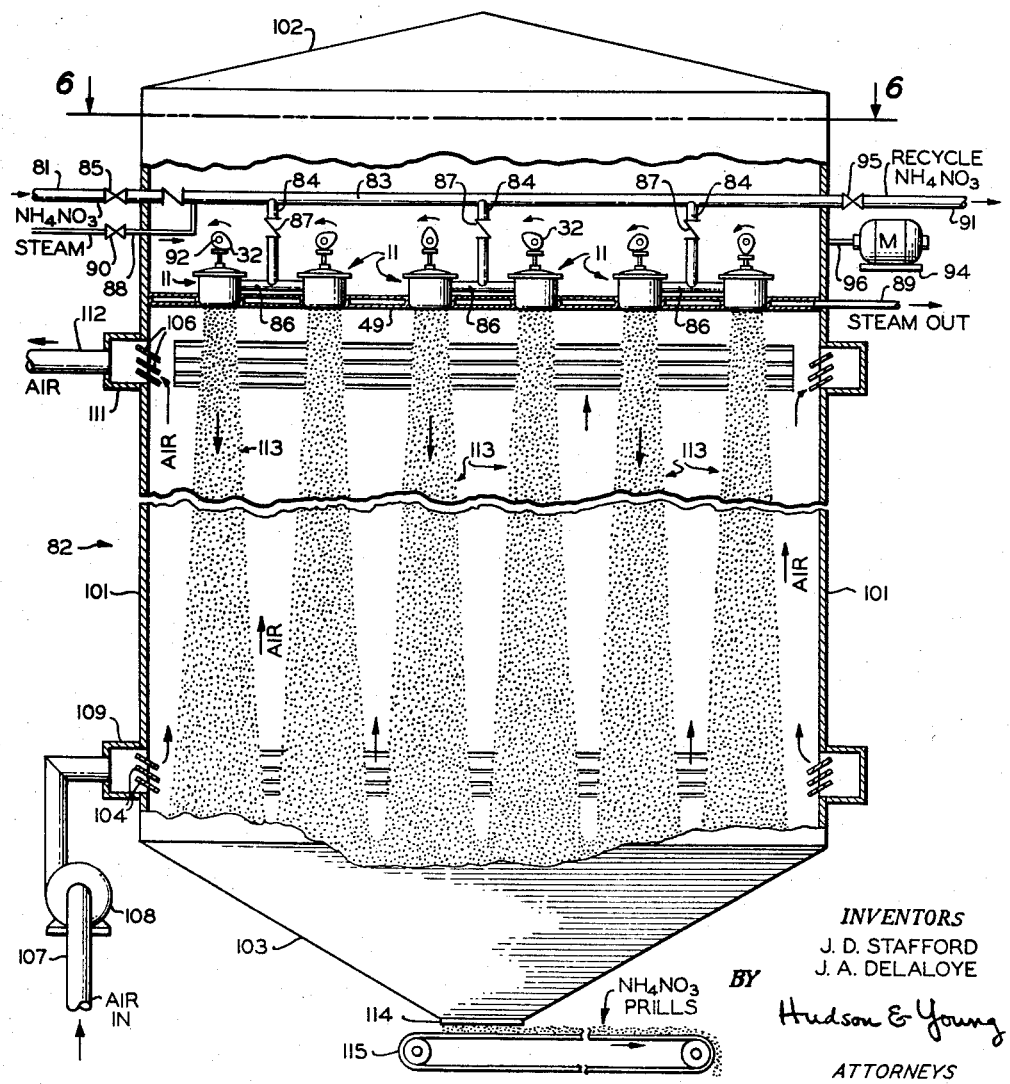
INVENTORS
J. D. STAFFORD
J. A. DELALOYE
BY Hudson & Young
ATTORNEYS INVENTORS
J. D. STAFFORD
J. A. DELALOYE
BY
Hudson & Young
ATTORNEYS

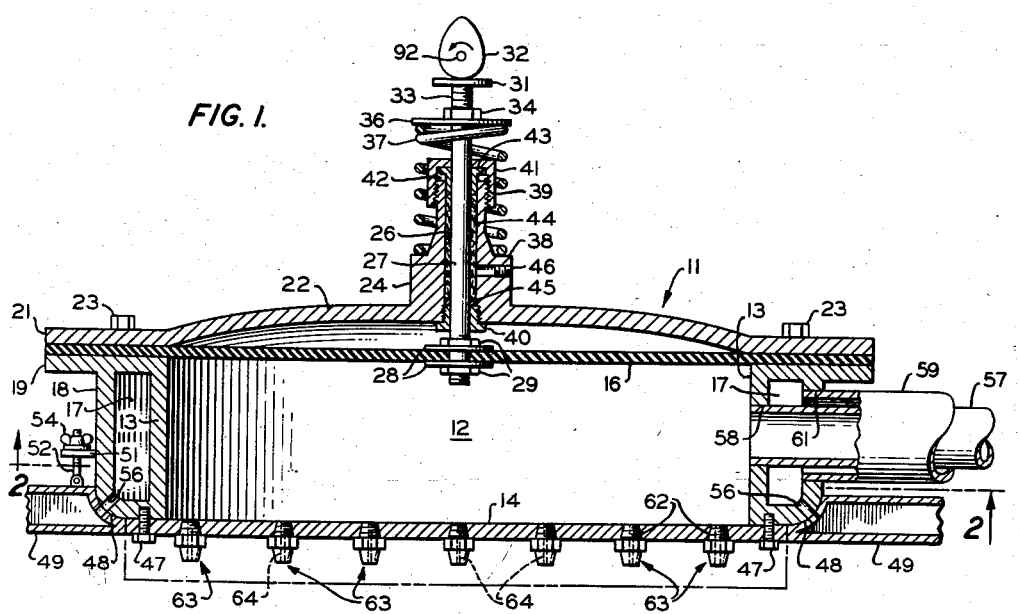
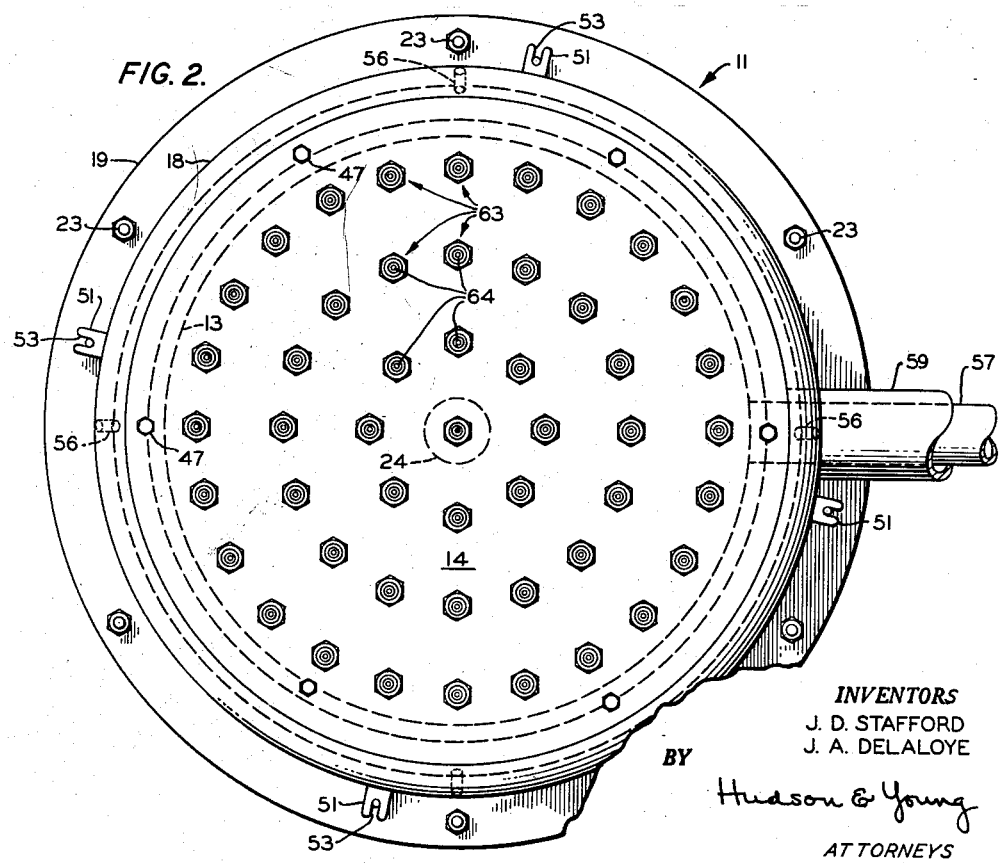

United States Patent Office 2,931,067
Patented Apr. 5, 1960

2,931,067

METHOD AND APPARATUS FOR PRODUCING GRANULATED AMMONIUM NITRATE

John A. Delaloye, Cactus, and Joseph D. Stafford, Jr., Dumas, Tex., assignors to Phillips Petroleum Company, a corporation of Delaware Application October 14, 1955, Serial No. 540,496

1 Claim. (Cl. 18—47.2)

This invention relates to the granulation of ammonium nitrate and other like materials. In one aspect it relates to apparatus for producing pebbled ammonium nitrate. In another aspect it relates to an improved method for producing pebbled ammonium nitrate.

Numerous processes have heretofore been known for pebbling ammonium nitrate melts to obtain a granulated product of desired granulated size suitable for application, for example, as fertilizer. The basic prilling process now being extensively used for producing granulated ammonium nitrate consists in spraying a hot, concentrated ammonium nitrate solution from the top of a tower and allowing the droplets to descend against a countercurrent stream of air at a low temperature, forming solid particles, termed "prills." The ammonium nitrate is continuously sprayed at constant pressure from straight pipe provided with twist drill holes at an angle, for example, 45° to the horizontal, upward in the tower for a distance of 18 feet, for example, in the form of a narrow rotating cone of solution which impinges tangentially on the upcoming stream of air. The spray of solution as it falls freely through the tower solidifies and forms a prill. The prills falling in the base of the tower are immediately passed on to a drier and then classified according to size, conditioned with coating or dusting materials, bagged and passed to storage.

The prills produced by this basic prilling process have, generally, desirable chemical and physical characteristics. However, the capacity of the prilling tower is necessarily limited because only a limited amount of spraying pipe is employed, on the inside periphery of the top of the tower, in order to allow the spray to fall freely downwardly through the peripheral ring of spray pipe.

Accordingly, an object of our invention is to provide a prilling tower having a greater capacity than the prilling towers used heretofore for producing granulated ammonium nitrate, and other like materials.

Another object is to provide an improved spraying unit which lends itself to ease of maintenance and operating efficiency.

Another object is to provide a pulsating, capillary droplet former for producing uniformly sized droplets of a liquid, such as concentrated ammonium nitrate melt.

A further object is to provide apparatus for producing ammonium nitrate prills having desirable physical and chemical characteristics.

A still further object is to provide an improved method for producing ammonium nitrate prills of uniform size thereby allowing them to flow freely and lessen their tendency to cake.

Other objects, advantages and features will become apparent to those skilled in the art from the following discussion, appended claims and drawings in which:

Figure 1 is a vertical cross-section view of the pulsating droplet former of my invention;

Figure 2 is a plan view of Figure 1 taken along the line 2—2;

Figure 3 is an enlarged cross-section view of the capillary nozzles of Figure 1;

Figure 4 is a vertical cross-section view of a modification of the droplet former of Figure 1;

Figure 5 is a side elevation view of a tower with certain portions cut away;

Figure 6:
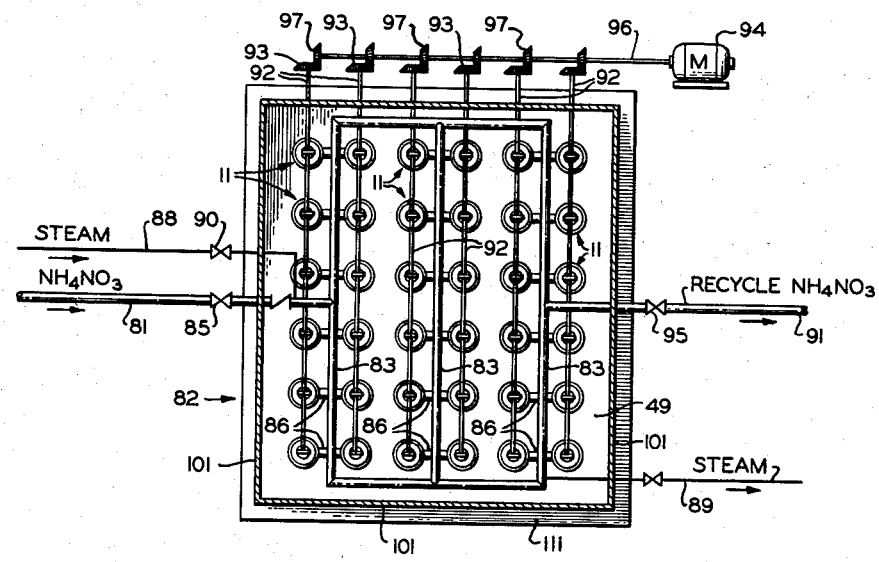
Figure 6 is a cross-section view of Figure 5 taken along the line 6—6.

Broadly contemplated, we propose by the practice of this invention to provide an improved method and apparatus for producing uniformly sized, granulated ammonium nitrate, or like material. A liquid such as hot, concentrated ammonium nitrate melt is fed to the top of a novel spray tower, conducted past check valves to a plurality of pulsating, capillary droplet formers of the instant invention, whereupon the pressure on the liquid is intermittently varied thereby causing the liquid to be ejected directly downward through a series of capillary nozzles in the form of uniformly sized droplets which fall directly downward through the height of the tower against a countercurrent stream of cooled gas, such as air. The uniformly sized prills are collected at the bottom of the tower and subsequently processed by well known methods.

Referring to the drawing now, and to Figure 1 in particular, a pulsating, capillary droplet former generally designated 11 is equipped with a feed chamber or receptacle 12, having a variable volume and preferably cylindrical, which is bounded by chamber side walls 13, a nozzle plate 14, and a flexible diaphragm 16. Diaphragm 16 may be made of rubber or any flexible substance preferably resistant to the attack of the feed solution. The side walls 13 of the feed chamber 12 are surrounded by an annular steam jacket chamber 17 which is in turn bounded by the outside of the side walls 13 and the outer side wall or housing 18 of the droplet former 11. The outer side wall 18 is provided with a flange 19 and the diaphragm 16 which extends across the top of the feed chamber 12 is secured thereto by the flange 21 of the bonnet 22 and bolts 23. Extending centrally upward from the bonnet 22 is stem support or guide 24 which is centrally provided with an opening 26 to allow the reciprocation of stem 27 therethrough. Stem 27 is centrally connected to the diaphragm 16 by diaphragm retaining plates 28 and nut 29. Connected to the other end of the stem 27 is a cam follower 31 which is in contact with cam 32. This end of the stem 27 is provided with threads 33 and the nut 34 screwed thereon permits the adjustment of spring retaining disc 36 which in turn permits the adjustment of the tension of spring 37. Spring 37 abuts the underside of the spring retaining disc 36 at one end and abuts the shoulder 38 of stem guide 24 at its other end. The stem guide 24 is threaded at its upper end 39 and packing adjustment nut 41 is screwed thereon. The inner cavity 42 of the packing adjustment nut 41 is adapted to receive packing retaining sleeve 43; packing adjustment nut 41 and packing retaining sleeve 43 are both provided with openings therethrough to permit passage of stem 27. Surrounding stem 27 in the passage 26 provided in the stem guide 24 is packing material 44 which may be lubricated by the lubricator tap 46 in the stem guide 24. Stem guide sleeve 40 having a passage therethrough is screwed into passage 26 at its lower end adjacent the inside wall of bonnet 22 and in addition to providing a guide for stem 27, it retains packing washer 45 in passage 26.

The nozzle plate 14 is connected to droplet former housing 18 by bolts 47. The droplet former 11 is adapted to fit in the shoulder 48 of steam-jacketed, droplet former support plate 49. The outer periphery of the droplet former housing 18 is provided with grooved brackets or lugs 51 which may be secured thereto by welding, for example. Bolt 52 pivotally connected to the top of the droplet former support plate 49 is adapted to be inserted in the groove 53 of lug 51 and secured thereto by butterfly nut 54. Communication between the steam jacket chamber 17 and the steam-jacketed, droplet former support plate 49 is provided by passage 56.

Feed line 57 enters the feed chamber 12 through opening 58 in the side feed chamber wall 13. Feed line 57 is surrounded by the steam-traced line 59 which communicates with the steam jacket chamber 17 through the opening 61 in the droplet former housing 18.

The nozzle plate 14 is provided with a plurality of threaded openings 62 in which are screwed a plurality of capillary nozzles 63, shown in detail in Figure 3. The capillary nozzles 63 are preferably arranged in concentric circles such as illustrated in Figure 2. The distance between the orifices 64 of the capillary 66 of the nozzles 63, for example, may be about ½" to 2" and the diameter of the nozzle plate 14 may be about 4 inches to 2 feet. The size of the orifices 64 may be between about .01 to .15 inch, preferably between about .025 to .05 inch. Smaller sizes may be used if proper precautions are taken to prevent the accumulation of dirt and/or the accumulation of solidified ammonium nitrate.

The capillary nozzles 63 and nozzle plate 14 are preferentially made of extremely hard steel or other material resistant to the corrosive and erosive action of the feed solution.

Referring to Figure 4, a modified droplet former generally designated 11' is shown with primed reference numerals used to designate parts similar to the parts of Figure 1. A cylinder 71 is screwed to the threads 39' on the outside of the top end of the stem guide 24'. The upper end 72 of the cylinder 71 is open to provide communication with a pulsating air conduit (not shown) and a piston 73 connected to the top of the stem 27 is adapted to move laterally within the chamber space 74 of the cylinder 71 against the force of spring 76.

In Figure 5 ammonium nitrate solution, under constant pressure and temperature, is supplied by feed line 81 through shut-off valve 85 to the top of the tower generally designated 82, thence to the feed header lines 83, and is subsequently conducted by lines 84, 86 to each of the droplet formers 11.

As shown in Figure 6 each of three feed header lines 83 extend across the top of the tower 82 between rows or banks of droplet formers 11. The feed header lines 83 and lines 84, 86 are steam-traced to ensure proper temperature of the solution and to prevent its solidification in any part of the system. Line 84 is provided with a check valve 87. Steam line 88 provided with shut-off valve 90 supplies steam to the steam-jacketed lines 83, 84, 86 and steam line 89 removes condensate from the unit. Excess feed solution is recycled by line 91 through shut-off valve 95.

All of the cams 32 of one row of droplet formers 11 are connected to the same cam shaft 92, one end of which is connected to a beveled gear 93. A motor 94 has a shaft 96 which extends across the width of the tower 82 and a plurality of spaced beveled gears 97 connected thereto transmit the rotary motion of the motor shaft 96 to the several cam shafts 92. As shown in Figure 5, the cams 32 do not all actuate the diaphragms 16 of all the droplet formers 11 at the same time, rather, they are so synchronized with the cam arrangement that only a limited number spray at the same time. However, it is within the scope of our invention to operate all of the droplet formers 11, or a portion thereof, at the same time. Check valve 87 is provided in each of the lines 84 in order to provide against the flow back of the said solution when the diaphragm 16 of the droplet former 11 is actuated. Check valves 87 can alternatively be placed in lines 83 immediately outside of the droplet former housing.

As shown in Figure 5, tower 82 has side walls 101, a roof 102, and a bottom 103 of inverted cone shape. Cooled air is added to the bottom portion of the tower 82 by any suitable means such as the louvers 104 which direct the air flow upwardly to the top portion of the tower 82 immediately below the droplet former support plate 49 where it is withdrawn through louvers 106. The air line 107 supplying cold air to the tower 82 is provided with an air blower 108 with a capacity, for example, of 40,000 c.f.m. at 20° C. The air in line 107 is conducted to an annular duct 109 and withdrawn through the annular duct 111 at the top of the tower. The withdrawn air, in line 112 is subsequently passed to an air scrubber (not shown) where the small amount of granulated material suspended therein is removed. The ammonium nitrate prills 113 falling to the bottom of the tower are removed through opening 114 and fall upon a belt conveyor 115.

Though we prefer to exhaust the countercurrent stream of air out through ducts 111 immediately below the support plate 49, in order that a dead-air space is provided thereabove, enabling workmen to remove a droplet former 11 from service without being exposed to the spray laden stream of air, it is within the scope of this invention to permit the passage of the stream of air past the support plate 49 and to employ suitable ducts for the exhaust thereof.

The arrangement of the various droplet formers in the support plate 49 may be varied and the particular arrangement best adapted to yield optimum results will be apparent to those skilled in the art once acquainted with the novel and improved apparatus of the present invention. Though we have illustrated the droplet formers 11 of our invention arranged in a plurality of banks, a greater or lesser number of my droplet formers 11 can be arranged in other configurations such as concentric rings, for example. The various steam-jacketed feed lines, air lines, cam shafts, etc., may be rearranged and modified to provide optimum results and we do not wish to limit our invention to that shown in the drawings. It is within the scope of this invention to provide heating means associated directly with the nozzle plate 49 and bonnet 22, and heating means other than that described and illustrated herein may be employed to maintain the feed solution at the appropriate temperature.

One of the features of our invention is the provision of spraying units which may individually be taken out of service for cleaning or repair wthout the necessity of shutting down other spraying units. This can be accomplished, for example, by releasing the butterfly nuts 54 and lifting the droplet former 11, to be cleaned or repaired, from the support plate shoulder 48 after having closed the shut-off valves in the appropriate feed lines and disconnecting the droplet formers 11 therefrom, etc.

In the modified tower 82 shown in cross section Figure 7, wherein primed reference numerals are used to designate parts similar to that of Figures 5 and 6, a gas, such as air, is supplied to a compressor 116 and subsequently conducted to the top of the tower 82' by line 117. An air pressure regulator or similar means 118 is operatively connected to air line 117 by valve 119. Main air line 117 conducts air to the several droplet formers 11', arranged in rows or banks by means of lines 121 and the air in these lines is exhausted through line 122 which is connected to an exhaust controller 123 which is operatively synchronized with air pressure regulator 124.

*Operation*

Concentrated aqueous ammonium nitrate (e.g., 95 percent solution, at a temperature above its crystallizing or saturation temperature is supplied to the top of the tower 82 by line 81 to the feed headers 83 and thus conducted by lines 84, 86 to the droplet formers 11. The ammonium nitrate solution passes through a check valve 87 in line 84 into the feed chamber 12. In Figure 1, cam 32 upon revolving about cam shaft 92 moves the cam follower 31 downward against the tension supplied by spring 37. Stem 27, which moves correspondingly downward in response thereto against the bias of spring 37 causes diaphragm 16 to move downwardly in feed chamber 12 whereupon the feed solution therein is ejected through the capillary nozzles 63 in the form of a spray. A slight pressure is maintained on the feed solution which forces it into the feed chamber 12 when the diaphragm 16 is moving towards its uppermost position. Check valve 87 prevents reversal of flow when diaphragm 16 moves downward. During each cycle only enough solution flows through the orifices 64 to form one drop of solution from each orifice. The droplets ejected from a droplet former will all be of the same uniform size. Preferably, the droplet formers 11 are so arranged in the support plate 49 that the various sprays of solution do not impinge on each other in order to prevent the production of fines. Furthermore, it is desirable to arrange the droplet formers 11 in such a manner that only a limited degree of impingement of the sprays on the tower walls occurs, otherwise the solidified material accumulating thereon may eventually break off in chunks and fall and plug up the bottom 103 of the tower 82.

The air, at atmospheric temperatures, supplied by the blowers 108 is preferably washed and filtered through glass wool as it is pulled into the annular duct 109; however, in certain environments where the humidity is low and the weather generally hot, the air need not be prepared in this manner but may be fed directly to the annular duct 109 from the atmosphere.

The steam supplied to the steam jacket chambers 17 of the droplet formers 11 by steam-traced line 59 circulates around the outside of the feed chamber 12, maintaining the feed solution in the feed chamber 12 at the desired temperature, and the steam condensate passes from the droplet former housing 18 through passage 56 to the steam-jacketed, droplet former support plate 49 where it is removed therefrom by the steam condensate line 89 (Figure 5).

Upon falling against the countercurrent of cooled air, the uniformly sized droplets of liquid solidify, in a manner well known in the art, and the prills falling into the bottom 103 of the tower 82 are collected and conveyed by belt conveyor 115 to a drier, and thence further processed by well known means. While the spraying step is essentially a cooling operation, a small amount of moisture is extracted from the prills as they fall through the tower.

Figure 7:
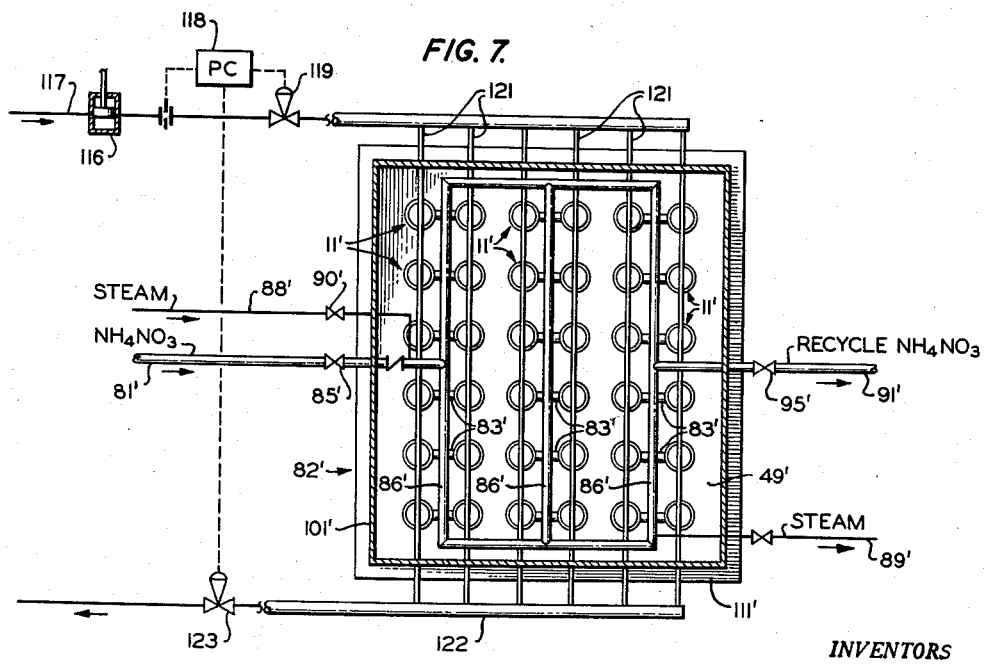
Figure 7 is a cross-section view of the tower shown in Figure 5 illustrating the modified droplet former of Figure 4.

In the modified droplet former 11' illustrated in Figures 4 and 7, an air pulse is supplied to the cylinder 71 causing the piston 73 therein to move downwardly and the stem 27' responsive thereto causes the diaphragm 16' to move downwardly in the feed chamber 12' and eject said solution in a manner similar to that described in Figure 1. The droplet formers 11' in the several banks are all adapted to be actuated at the same time, i.e., the solution in each of the droplet formers 11' is sprayed from all of the nozzles 63 at the same time. However, it is within the scope of this invention to actuate the several droplet formers 11' at different times (which may be accomplished by employing the desired number of air pressure regulators, or similar means), in a manner similar to that described in Figure 6. It is believed unnecessary to further describe the method of producing the granulated product, as this is well known in the art.

Where the term "concentrated ammonium nitrate" is used in this specification and the appended claim, we mean to include any solution of ammonium nitrate that is not so highly concentrated that it will not flow and that is sufficiently concentrated to enable the droplets thereof that are sprayed in the cooled gaseous medium to solidify in the manner well known in the art. The terms "granulated ammonium nitrate," "pebbled ammonium nitrate," "ammonium nitrate solution," "ammonium nitrate prills," and "ammonium nitrate melts" as used herein are not limited to materials containing only ammonium nitrate but include other materials which may be present such as calcium carbonate, limestone, dolomite, etc.; however, the ammonium nitrate constitutes the continuous phase in which these other materials are dispersed.

Utilizing the novel methods and apparatus of the instant invention, the production of granulated ammonium nitrate at a commercial scale greater than that of conventional prilling towers is achieved at a relatively lower cost.

While we have described our invention as applied to the production of ammonium nitrate prills from concentrated ammonium nitrate solution or melts, obviously our invention is not necessarily limited thereto, and the method and apparatus described and illustrated herein can be employed in the production of other granulated materials such as salts having chemical and physical characteristics similar to that of ammonium nitrate, such as urea, mixtures of ammonium nitrate and ammonium phosphate, and the like, from melts similar to ammonium nitrate melts. Furthermore, various modifications of the embodiments illustratively set forth herein will become apparent to those skilled in the art and can be made without departing from the scope and spirit of this invention.

We claim:

A method for the production of ammonium nitrate prills, which comprises flowing concentrated ammonium nitrate melt under pressure to a stationary zone, intermittently varying mechanically applied pressure on the body of said melt in said stationary zone so as to intermittently discharge droplets of said melt from said stationary zone through a plurality of small openings, said droplets constituting a small fraction of said body of said melt to which said pressure is applied, and allowing said droplets to freely fall solely under the influence of gravity through a countercurrently circulating zone of cool air whereby said droplets are solidified in the form of prills.

References Cited in the file of this patent

UNITED STATES PATENTS

| | | |
|---|---|---|
| 1,938,219 | Eckerbom | Dec. 5, 1933 |
| 1,951,790 | Curran | Mar. 20, 1934 |
| 2,065,124 | Dreyfus | Dec. 22, 1936 |
| 2,167,432 | Cox et al. | July 25, 1939 |
| 2,379,816 | Mables | July 3, 1945 |
| 2,510,574 | Greenhalgh | June 6, 1950 |
| 2,528,407 | Yeandle | Oct. 31, 1950 |
| 2,570,423 | Batchelder et al. | Oct. 9, 1951 |
| 2,587,309 | Giraitis | Feb. 26, 1952 |
| 2,714,224 | Schaub | Aug. 2, 1955 |